(12) United States Patent
Bowden-Peters

(10) Patent No.: US 10,082,367 B2
(45) Date of Patent: Sep. 25, 2018

(54) METHOD AND APPARATUS FOR A STRIKE ON A TARGET

(71) Applicant: MBDA UK Limited, Stevenage, Hertfordshire (GB)

(72) Inventor: Edwin John William Bowden-Peters, Stevenage (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 281 days.

(21) Appl. No.: 14/898,170

(22) PCT Filed: Jun. 12, 2014

(86) PCT No.: PCT/GB2014/051807
§ 371 (c)(1),
(2) Date: Dec. 14, 2015

(87) PCT Pub. No.: WO2014/199163
PCT Pub. Date: Dec. 18, 2014

(65) Prior Publication Data
US 2016/0123705 A1    May 5, 2016

(30) Foreign Application Priority Data
Jun. 14, 2013 (GB) .................. 1310767.7

(51) Int. Cl.
*F41G 7/22* (2006.01)
*G01S 17/06* (2006.01)
(Continued)

(52) U.S. Cl.
CPC .......... *F41G 7/2293* (2013.01); *F41G 3/145* (2013.01); *F41G 7/008* (2013.01); *F41G 7/226* (2013.01); *F41G 7/2246* (2013.01); *G01S 17/06* (2013.01)

(58) Field of Classification Search
CPC ...... F41G 7/2293; F41G 3/145; F41G 7/2246; F41G 7/008; F41G 7/226; F41G 1/35; G01S 17/06; F42B 12/42
See application file for complete search history.

(56) References Cited

U.S. PATENT DOCUMENTS 4,259,009 A * 3/1981 Jernigan ................. F41G 3/145
5,458,041 A * 10/1995 Sun et al. ............... F41G 7/008
(Continued)

FOREIGN PATENT DOCUMENTS

| EP | 1035399 A1 | 9/2000 |
|---|---|---|
| EP | 1719969 A1 | 11/2006 |
| GB | 2445849 A | 7/2008 |

OTHER PUBLICATIONS

International Search Report dated Sep. 18, 2014 issued in PCT/GB2014/051807.
(Continued)

*Primary Examiner* — Bernarr E Gregory
(74) *Attorney, Agent, or Firm* — Scully, Scott, Murphy & Presser, PC

(57) ABSTRACT

A method of conducting a strike against a target using a designator and a missile. The following steps are conducted:
(i) the designator designates the target using a first signal, such as a laser;
(ii) the missile detects the laser reflected off the target;
(iii) after detecting the reflected laser, the missile emits a second signal, such as a LADAR signal, to designate the target;
(iv) the missile tracks the so-designated target;
(v) the designator detects the LADAR signal reflected off the target; and
(vi) in response to detecting the reflected LADAR signal, the designator stops the designation of the target. This
(Continued)

may enable the designator to perform other tasks, while the missile tracks and engages the target.

18 Claims, 2 Drawing Sheets

(51) Int. Cl.
*F41G 3/14* (2006.01)
*F41G 7/00* (2006.01)

(56) References Cited

U.S. PATENT DOCUMENTS

| | | | |
|---|---|---|---|
| 5,826,819 A | 10/1998 | Oxford | |
| 7,964,831 B2 | 6/2011 | Hurty | |
| 2006/0075455 A1* | 4/2006 | Ljungberg et al. | F41G 7/008 |
| 2006/0124838 A1* | 6/2006 | Baker et al. | F41G 7/008 |
| 2006/0232761 A1* | 10/2006 | McConville et al. | F42B 12/42 |
| 2009/0078817 A1 | 3/2009 | Williams | |
| 2012/0050714 A1* | 3/2012 | McConville et al. | F41G 1/35 |

OTHER PUBLICATIONS

GB Search Report dated Dec. 4, 2013 issued in GB1310767.7.
International Preliminary Report on Patentability with the Written Opinion dated Dec. 23, 2015 received in related International Application No. PCT/GB2014/051807.

\* cited by examiner

METHOD AND APPARATUS FOR A STRIKE ON A TARGET

FIELD OF THE INVENTION

The present invention relates to methods of conducting a strike on a target and to an apparatus for such a strike.

BACKGROUND ART

In some missile strikes, a designator (such as an operator in the loop (OITL), or a remotely-located UAV) first designates the target by directing a laser beam onto the target. When a seeker on a missile then detects the reflection of the designating laser beam, the missile's guidance system steers the missile towards the reflection of the designating laser thereby striking the target. This form of missile guidance is often referred to as semi-active laser (SAL) homing.

A drawback with this type of strike is that the designator must keep the designating signal directed at the target up to the point at which the missile strikes. This can place the designator in danger, especially during the final phase of the strike.

DISCLOSURE OF THE INVENTION

According to a first aspect of the invention, there is provided a method of conducting a strike against a target using a designator and a missile, in which method the following steps are conducted:

(i) the designator designates the target using a first signal;
(ii) the missile detects the first signal reflected off the target;
(iii) after detecting the reflected first signal, the missile emits a second signal to designate the target;
(iv) the missile tracks the so-designated target;
(v) the designator detects the second signal reflected off the target; and
(vi) having detected the reflected second signal, the designator stops designating the target using the first signal, thereby enabling the designator to perform other tasks, whilst the missile tracks and engages the target. Thus, by virtue of the missile emitting the second signal, the designator can detect when the missile has designated the target. This enables the designator to move away from the target in the knowledge that the missile should now be independently tracking the target itself.

The second signal may be encoded with information. Step (vi) may comprise the step of decoding the second signal to read the information. Step (iv) may comprise the step of stopping the designation of the target in response to the decoded information. The encoding preferably abides to the NATO Standardization Agreement (STANAG). The second signal may be encoded with information relating to the strike. The information may be indicative of the identity of the missile (for example a pulse pattern that enables the missile to be identified as a missile launched by the designator's fellow combatants or allies). Thus, the designator can better differentiate between a signal originating from the missile (the second signal) and a spurious signal. The information may be indicative of the operating status of the missile. For example, the second signal may be encoded with information to indicate that the missile has detected the first signal reflected off the target, and more preferably that it has designated the target. The information may be indicative of other aspects of the strike such as timings, direction of strike, type/class of target.

The second signal may be a laser signal. The second signal may be a high pulse repetition frequency (high PRF) signal. The second signal is preferably a LAser Detection And Ranging (LADAR) signal. In principle, the second signal may be a flash LADAR signal, but it is more preferably a scanning LADAR signal. More preferably the signal is a spot-scanning LADAR signal. Using laser, and more preferably a LADAR signal, has been found to be especially beneficial because LADAR signals (especially scanning-LADAR signals) tend to be pulsed at sufficiently high frequencies such that the signal can be readily encoded with information.

In principle, the second signal, used to designate the target, may be different from the signal being used to track the target. For example, the missile may designate the target using a simple un-encoded laser beam, which may be detected by the designator (e.g. its intensity, wavelength, scanning pattern etc.). In some embodiments however, the same signal may be used for both tracking and designation. Thus, in step (iv) the designated target may also be tracked using the second signal. A LADAR signal has been found to be especially beneficial because it is able to be used for both functions. The signal may be used in different ways to designate and track the target. For example, the target may be designated by directing the signal in a fixed (spot) location (or scanning a very small area), whereas the target may be tracked by tracking an image obtained by scanning the target with the LADAR signal. This may be beneficial if the target is a moving/moveable target. In other embodiments the signal may used in the same way to designate and track the target. For example, the second signal may be directed at a fixed location to designate a fixed ground target, and if the missile is aware that the target will not move, there may be no need to scan the target; the missile can simply track the designating spot.

The second signal may be directed in proximity to the location at which the first signal designates the target. The second signal may be directed coincident with the location at which the first signal designates the target. Such an arrangement enables the second signal to be readily observed as the designator will typically already be detecting a reflection of the first signal. The detector may, for example, detect an intensity spike when the second signal designates the target. Alternatively or additionally, the detector may detect an increase in the number of pulses reflected off the target when the second signal designates the target.

It will be appreciated that steps (iv) and (v) need not necessarily be conducted in that order.

The first signal may be a laser signal. The first signal may be a high PRF signal. The first signal may be a LADAR signal. The first signal may be encoded with information. The first signal may be encoded with information relating to the strike. The method may comprise the step of the missile decoding the information in the first signal. The first signal may, for example, be encoded with information for assisting the missile in engaging the target. For example the information may include the type of target, the type of approach required, the timing of engagement required etc.). Alternatively or additionally, the first signal may be encoded with information to confirm that the designator has detected the second signal (as and when that has occurred). It will be appreciated that the first signal may be continually encoded with some information (e.g. the identity of the source), but only encoded with other information (e.g. confirmation of detection of the second signal) at specific times. Thus, the method may comprise the step of encoding the first signal. The step of encoding the first signal may be in response to step (v).

According to another aspect of the invention there is provided a designator in combination with a missile, the designator comprising: (a) a laser source for emitting a first laser signal for designating a target, (b) a detector for detecting a reflection of a second signal; and (c) a decoder for decoding the reflection of second signal; and the missile comprising: (A) an encoder for encoding the second signal, (B) a source for emitting the second signal, (C) a detector for detecting the reflection of the first signal and for detecting a reflection of the second signal, and (D) a guidance system switchable between guiding the missile to the target in a first mode that is dependent on the detection of the reflection of the first signal, and in a second mode that is dependent on the detection of the reflection of the second signal. Missiles that are operable between two modes of operation (e.g. SAL and active (LADAR) modes of operation) are known per se (e.g. see EP 1035399 in the name of Lockheed Martin)). However, the present invention recognises that by providing the designator with a detector for detecting the second signal, the designator can know when to cease designating the target prior to missile strike.

The first mode of the guidance system may be a SAL guidance mode. The second mode of the guidance system may be an active guidance mode. The missile may be switchable between the two modes in response to designating the target. The missile may be arranged to encode the second signal with information. The missile may be arranged to encode the second signal with information to indicate that the target has been designated. The designator may comprise an encoder to encode the first signal with information (for example to indicate that the second signal has been successfully detected). The missile may be switchable between the two modes in response to emitting the encoded second signal that indicates that the target has been designated. More preferably the missile is switchable between the two modes in response to receiving and decoding the encoded first signal that indicates the second signal has been successfully detected by the designator.

It will be appreciated that the detector of the designator and/or missile may comprise two separate detectors (e.g. a first detector for the first signal and a second detector for the second signal), or may comprise a single detector capable of detecting both signals. The detector may be part of a seeker. The detector of the designator may be arranged to detect a reflection of the first laser signal.

The encoding of the, or each, encoder preferably abides by STANAG regulations.

The second signal may be a LADAR signal, and more preferably a scanning LADAR signal. The second signal may be a spot-scanning LADAR signal.

The designator may take a number of forms. For example, the designator may be (but is not limited to) a UAV, an operator in the loop (OITL) or a man in the loop (MITL). In some embodiments of the invention, the designator may be a missile. This designator missile may be a master missile (i.e. a missile that is not used to strike the target, but that only operates as the claimed designator).

In principle, the present invention may be used against any target, but the target is preferably a ground target. A ground target lends itself to this type of strike using a designator because the targets tend to be relatively slow moving. The target may be stationary. The target may be a ground vehicle.

It will be appreciated that any features described with reference to one aspect of the invention are equally applicable to any other aspect of the invention, and vice versa. For example, features described with reference to the method of the invention are equally applicable to the apparatus of the invention.

BRIEF DESCRIPTION OF THE DRAWINGS

An example embodiment of the invention will now be described by way of example only and with reference to the accompanying drawings, of which.

DETAILED DESCRIPTION

Figure 1:
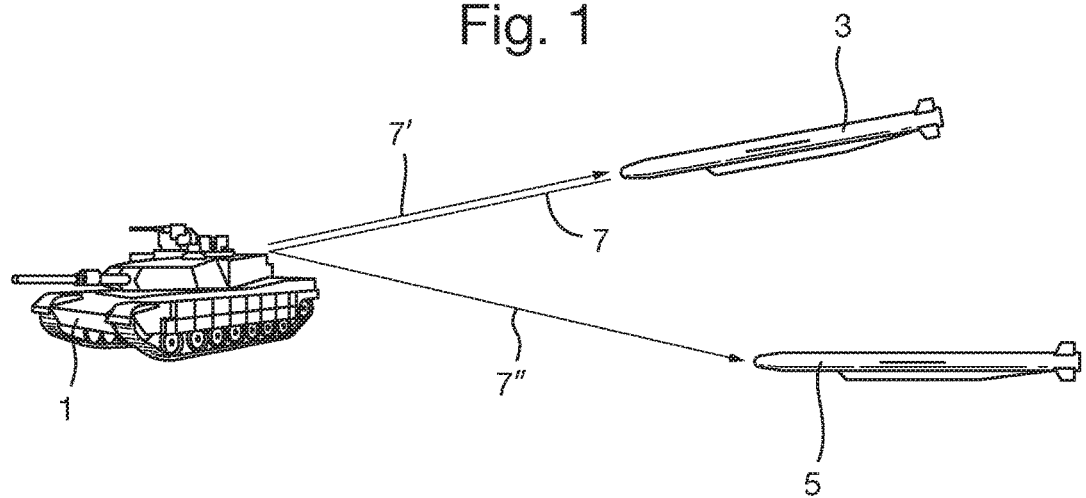
FIG. 1 is a schematic of a first stage during a strike against a target tank, in which a designator is designating the target.
Figure 2:
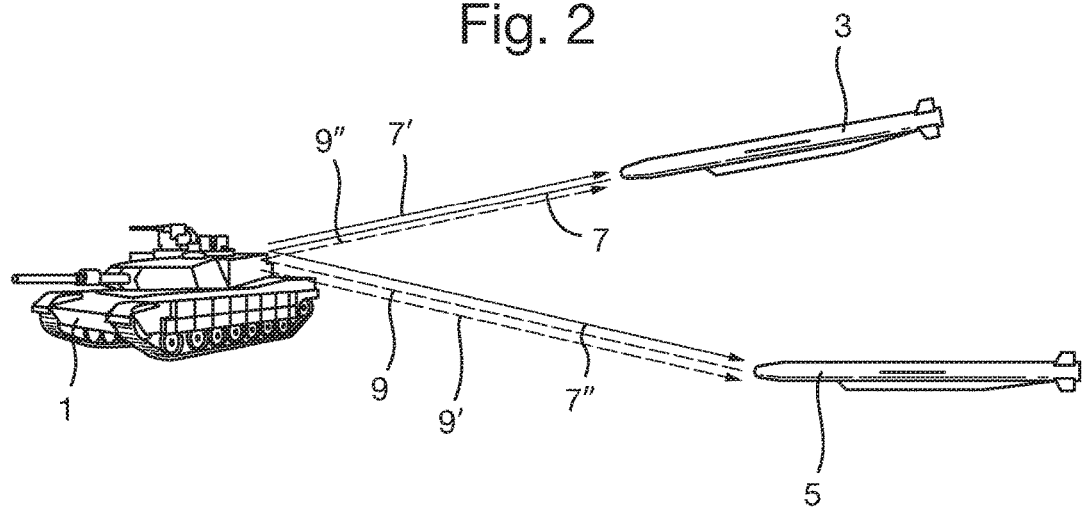
FIG. 2 is a schematic of the strike in FIG. 1 showing a later stage in which the missile has designated the target.
Figure 3:
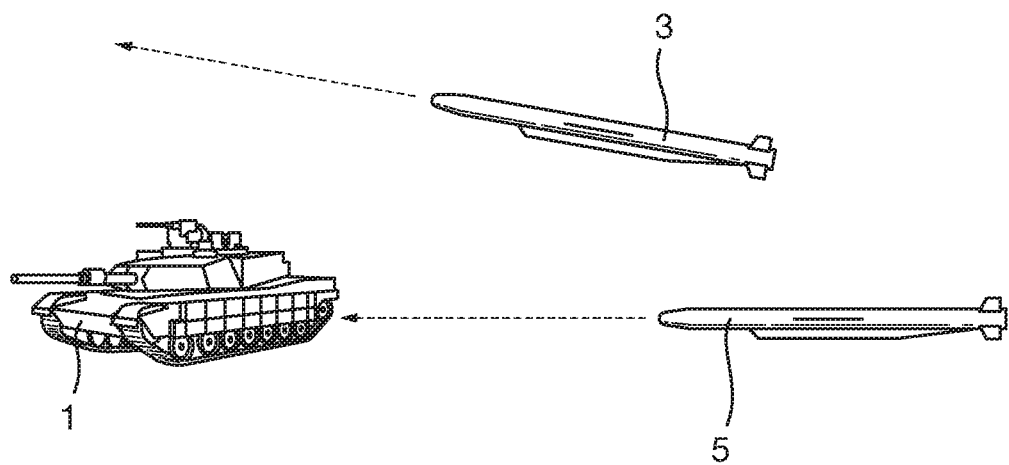
FIG. 3 is a schematic of the strike in FIG. 2 showing a later stage in which the designator is no longer designating the target.

With reference to FIGS. 1 to 3 there is described a method and apparatus for conducting a strike against a target 1 (in this embodiment the target is a tank). The apparatus comprises a designator missile 3 (herein after referred to as the 'designator') and a slave missile 5. The designator 3 comprises a seeker (not shown) for generating a high pulse repetition frequency (high PRF) laser signal 7 and for detecting a reflection 7' of the laser signal off the target 1. In the first embodiment of the invention the laser signal 7 emitted by the seeker of the designator 3 is a LADAR signal. The designator uses LADAR to identify the target 1 (in accordance with known methods) and then designates the target 1 by directing the laser signal 7 at part of the target (see FIG. 1). In other embodiments of the invention (not shown), the designator need not necessarily be a missile; it may for example be an OITL or a UAV and need not necessarily use a LADAR signal. It will be appreciated that in all cases, however, the designator designates the target.

As shown in FIG. 1, a reflection 7" of the laser signal 7 from the designator 3 is detected by a seeker (not shown) on front of the slave missile 5. When the slave missile receives the reflected signal 7" its guidance system initially operates in a semi-active mode to home in on the reflected signal 7".

Referring now to FIG. 2, in the first embodiment of the invention, when the seeker in the slave missile 5 has detected the reflected laser signal 7", the missile 5 emits its own encoded LADAR signal 9. This LADAR signal 9 is a spot-scanning LADAR. As described in more detail below, the LADAR signal 9 is used to designate and then identify the target 1. Once the target has been designated and identified, the guidance system (not shown) in the missile is switched to an active mode in which the missile's own LADAR signal (reflected back as signal 9') is used to track the designated target 1. Active guidance systems that can perform this function are known per se, and are therefore not discussed in more detail here.

In the active-mode, the slave missile 5 can track the target 1 without further input from the designator 3. However, a problem arises in conveying this information to the designator 3. The present invention recognises that the LADAR signal 9 of the slave missile 5 can be used to convey this information, as will now be described below.

The slave missile designates the target 1, by directing the LADAR signal 9 onto a small area (i.e. spot) on the target coincident with the first signal 7 from the designator. A reflection 9" of this LADAR signal is detected by the designator 3. This is detected as a spike in intensity. The spot-scanning LADAR signal 9 from the slave missile has a specific pulsed encoding (compliant with STANAG). The designator 3 includes a decoder unit for decoding the reflected signal 9". Using the combination of the detection of the intensity spike and the decoding of the signal, the designator is able to identify that the correct slave missile 5 has now designated the target.

In the first embodiment of the invention, the designator comprises an encoder for encoding the first signal with information for sending back to the missile. More specifically, an encoded first signal is used to indicate that the second signal has been successfully detected and decoded, and that the designator will shortly be stopping its designation. The encoded first signal is also used to indicate details relating to the strike, for example the nature of the target (e.g. it is moveable), and/or details of preferred approach routes. This encoded first signal 7 is emitted by the designator and the reflection 7" of the encoded first signal is received by the missile 5 and decoded. Thus, not only is the designator 3 aware that the missile 5 has now designated the target 1, but the missile 5 is also aware that the designator 3 has received this information and will be stopping its designation. The embodiment of the present invention recognises that the first and second signals can be used to not only designate the target, but to also convey information between the designator and missile.

In response to this exchange of information, the missile switches to the active mode. Thus, the second signal is used to scan the target and generate images by which the target can be tracked. In accordance with known methods, the missile 5 can thus engage the target 1. In the meantime, the designator ceases designating the target (in the knowledge that the missile has designated it) and can safely relocate away from the target.

These final stages in the process are shown in FIG. 3; the designator 3 stops emitting its laser signal 7, and moves away from the target. The slave missile on the other hand, continues to track, and eventually strike, the target using its guidance system in active mode. The trajectories of each designation and missile are shown by the dotted arrows of FIG. 3.

Whilst the present invention has been described and illustrated with reference to a particular embodiment, it will be appreciated by those of ordinary skill in the art that the invention lends itself to many different variations not specifically illustrated herein. For example, in some embodiments additional or different information may be contained in the second signal. In some embodiments the first signal may not necessarily be encoded to convey information (i.e. there is only one-way communication of information from missile to designator). In some embodiments the second signal need not necessarily be used to generate an image to track the target (for example for a stationary target the missile may designate the target with a spot signal and simply track the location of that spot.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of conducting a strike against a target using a designator and a missile, in which method the following steps are conducted:
   (i) the designator designates the target using a first signal;
   (ii) the missile detects the first signal reflected off the target;
   (iii) after detecting the reflected first signal, the missile emits a second signal to designate the target;
   (iv) the missile tracks the so-designated target;
   (v) the designator detects the second signal reflected off the target; and
   (vi) having detected the reflected second signal, the designator stops designating the target using the first signal, thereby enabling the designator to perform other tasks, whilst the missile tracks and engages the target.

2. A method according to claim 1, wherein the second signal is encoded with information, and step (vi) comprises decoding the second signal to read the information.

3. A method according to claim 1, wherein the second signal is a laser signal.

4. A method according to claim 1, wherein the second signal is a LADAR signal.

5. A method according to claim 4 wherein the second signal is a scanning LADAR signal.

6. A method according to claim 1 wherein in step (iv) the designated target is tracked using the second signal.

7. A method according to claim 1, wherein the first signal is a laser signal.

8. A method according to claim 1, wherein the first signal is encoded with information, and wherein the method comprises the step of decoding the first signal.

9. The method according to claim 1, further including the missile including information in the second signal indicating that the missile has designated the target.

10. The method according to claim 9, wherein step (vi) includes in response to the designator detecting that the reflected second signal contains information indicating that the missile has designated the target, the designator stops designating the target using the first signal.

11. The method according to claim 10, further including the designator including information in the first signal indicating that the designator is aware that the missile has designated the target and will stop sending the first signal.

12. The method according to claim 11, further including the missile detecting that the first signal contains information indicating that the designator will stop sending the first signal.

13. A target designating system comprising:
   a designator comprising: (a) a laser source for emitting a first laser signal for designating a target, (b) a detector for detecting a reflection of a second signal; and (c) a decoder for decoding the reflection of second signal; and
   a first missile comprising: (A) an encoder for encoding the second signal, (B) a source for emitting the second signal, (C) a detector for detecting the reflection of the first signal and for detecting a reflection of the second signal, and (D) a guidance system switchable between guiding the first missile to the target in a first mode that is dependent on the detection of the reflection of the first signal, and in a second mode that is dependent on the detection of the reflection of the second signal.

14. The target designating system according to claim 13, the encoder in the first missile being arranged to encode the second signal with information.

15. The target designating system according to claim 13, wherein the designator comprises an encoder to encode the first signal with information, and the first missile comprises a decode to decode the first signal.

16. The target designating system according to claim 13, wherein the second signal is a LADAR signal.

17. The target designating system according to claim 13, wherein the designator is a second missile.

18. The target designating system according to claim 13, wherein the target is a ground target.

\* \* \* \* \*